(12) United States Patent
Huang et al.

(10) Patent No.: US 11,223,779 B2
(45) Date of Patent: Jan. 11, 2022

(54) IMAGE SENSING DEVICE AND OPERATING METHOD THEREOF

(71) Applicant: NOVATEK Microelectronics Corp., Hsinchu (TW)

(72) Inventors: Dong-Hai Huang, Hsinchu (TW); Chi-Fan Liou, Taoyuan (TW); Jie-Jung Huang, Miaoli County (TW)

(73) Assignee: NOVATEK Microelectronics Corp., Hsinchu (TW)

( * ) Notice: Subject to any disclaimer, the term of this patent is extended or adjusted under 35 U.S.C. 154(b) by 0 days.

(21) Appl. No.: 16/899,593

(22) Filed: Jun. 12, 2020

(65) Prior Publication Data

US 2021/0392260 A1 Dec. 16, 2021

(51) Int. Cl.
*H04N 5/235* (2006.01)

(52) U.S. Cl.
CPC ......... *H04N 5/2356* (2013.01); *H04N 5/2357* (2013.01)

(58) Field of Classification Search
CPC ... H04N 5/2356; H04N 5/2357; H04N 5/2353
See application file for complete search history.

(56) References Cited

U.S. PATENT DOCUMENTS

| | | | |
|---|---|---|---|
| 7,829,969 B2 | 11/2010 | Altice, Jr. et al. | |
| 8,089,036 B2 | 1/2012 | Manabe | |
| 9,402,039 B2 | 7/2016 | Solhusvik et al. | |
| 9,467,633 B2 | 10/2016 | Johnson et al. | |
| 9,596,423 B1 | 3/2017 | Molgaard | |
| 9,686,488 B2 | 6/2017 | Barna | |
| 9,736,411 B2 | 8/2017 | Guillon et al. | |
| 10,009,558 B2 | 6/2018 | Lule et al. | |
| 2017/0118424 A1* | 4/2017 | Lule | H04N 9/04557 |
| 2020/0092458 A1* | 3/2020 | Wang | H04N 5/2355 |

* cited by examiner

*Primary Examiner* — Ahmed A Berhan

(74) *Attorney, Agent, or Firm* — CKC & Partners Co., LLC

(57) ABSTRACT

An operating method of an image sensing device capable of detecting several light emitting diodes each having a flickering cycle time, the image sensing device includes several pixel circuits, each of the several pixel circuits includes a first sensing circuit and a second sensing circuit, the operating method including the following operations: operating the image sensing device in a first operating mode, including: sensing light by the first sensing circuit with a first exposure time longer than the flickering cycle time, thereby obtaining a first sensing result; sensing light, simultaneously by the first sensing circuit and the second sensing circuit with a second exposure time shorter than the flickering cycle time, thereby obtaining a second sensing result and a third sensing result; determining whether there is LED (light emitting diode) flickering or not according to the first sensing result, the second sensing result and the third sensing result.

16 Claims, 9 Drawing Sheets

IMAGE SENSING DEVICE AND OPERATING METHOD THEREOF

FIELD OF INVENTION

The invention relates to an image sensing device and an operating method thereof. More particularly, the invention relates to an image sensing device and an operating method thereof with sensing circuits of different sensitivities.

BACKGROUND

Since the LED (light emitting diode) for traffic light is mostly controlled to be flashing at a specific frequency. Generally, the international standard (such as EN12966) is 90 Hz or more, so the exposure time of detecting the LED signal needs to exceed 1/90 (11.1 m sec) to ensure that there is a way to detect the LED signal for each exposure. However, under strong light environment, the exposure time is shortened so as to obtain better scene detection, and the LED detection capability may be sacrificed.

SUMMARY

An embodiment of this disclosure is to provide an operating method of an image sensing device capable of detecting several light emitting diodes each having a flickering cycle time, the image sensing device includes several pixel circuits, each of the several pixel circuits includes a first sensing circuit and a second sensing circuit, the operating method including the following operations: operating the image sensing device in a first operating mode, including: sensing light by the first sensing circuit with a first exposure time longer than the flickering cycle time, thereby obtaining a first sensing result; sensing light, simultaneously by the first sensing circuit and the second sensing circuit with a second exposure time shorter than the flickering cycle time, thereby obtaining a second sensing result and a third sensing result; determining whether there is LED (light emitting diode) flickering or not according to the first sensing result, the second sensing result and the third sensing result.

Another embodiment of this disclosure is to provide An operating method of an image sensing device capable of detecting several light emitting diodes each having a flickering cycle time, the image sensing device includes several pixel circuits, each of the several pixel circuits includes several sensing circuits, the operating method including: determining a first exposure time to detect whether there is LED flickering; and performing an additional light sensing with a second exposure time longer than the flickering cycle time prior to performing light sensing with the first exposure time shorter than the flickering cycle time so as to increase detection accuracy of LED flickering when it is determined to detect whether there is LED flickering or not by sensing light with the first exposure time shorter than the flickering cycle time.

Another embodiment of this disclosure is to provide an image sensing device capable of detecting several light emitting diodes each having a flickering cycle time, the image sensing device including several pixel circuits, wherein each of the several pixel circuits includes: a first sensing circuit, configured to sense light with a first exposure time longer than a flickering cycle time, thereby obtaining a first sensing result; a second sensing circuit, wherein the first sensing circuit and the second sensing circuit are configured to sensing light simultaneously with a second exposure time shorter than the flickering cycle time, thereby obtaining a second sensing result and a third sensing result; and an output circuit, configured to determine whether there is LED flickering or not according to the first sensing result, the second sensing result and the third sensing result.

Therefore, according to the technical concept of the present invention, embodiments of this disclosure are to provide an image sensing device and an operating method thereof, and in particular, the invention relates to an image sensing device and an operating method thereof with sensing circuits of different sensitivities. By performing an additional light sensing with an exposure time longer than the flickering cycle time of the LED under strong light environment, the LED detection capability under strong light is maintained without sacrificing dynamic range.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
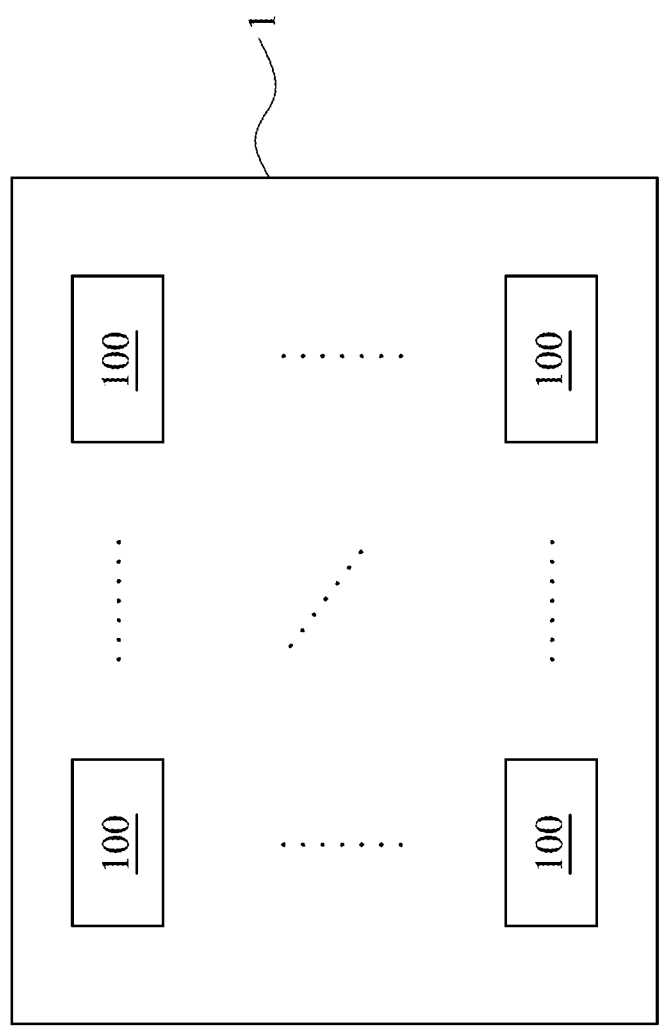
FIG. 1 is a schematic diagram illustrating an image sensing device according to some embodiments of the present disclosure.

The following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention.

Reference is made to FIG. 1. FIG. 1 is a schematic diagram illustrating an image sensing device 1 according to some embodiments of the present disclosure. The image sensing device 1 is capable of detecting several light emitting diodes each having a flickering cycle time, in which the flickering cycle time of the light emitting diodes may be different. As illustrated in FIG. 1, the image sensing device 1 includes several pixel circuits 100.

Figure 2:
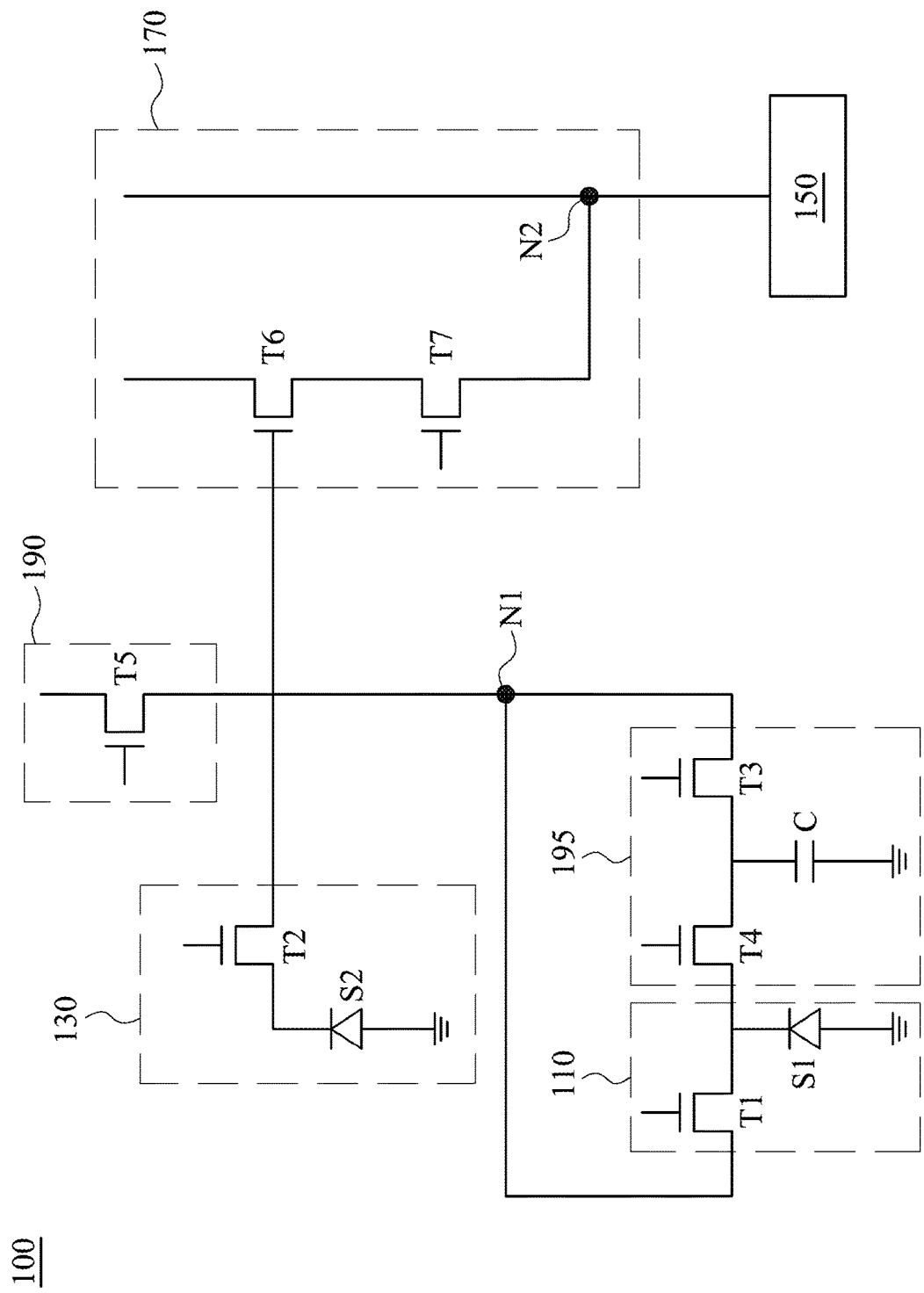
FIG. 2 is a schematic diagram illustrating a pixel circuit according to some embodiments of the present disclosure.

Reference is made to FIG. 2. FIG. 2 is a schematic diagram illustrating a pixel circuit 100 according to some embodiments of the present disclosure. As illustrated in FIG. 2, the pixel circuit 100 includes a sensing circuit 110, a sensing circuit 130, and an output circuit 150.

Figure 3:
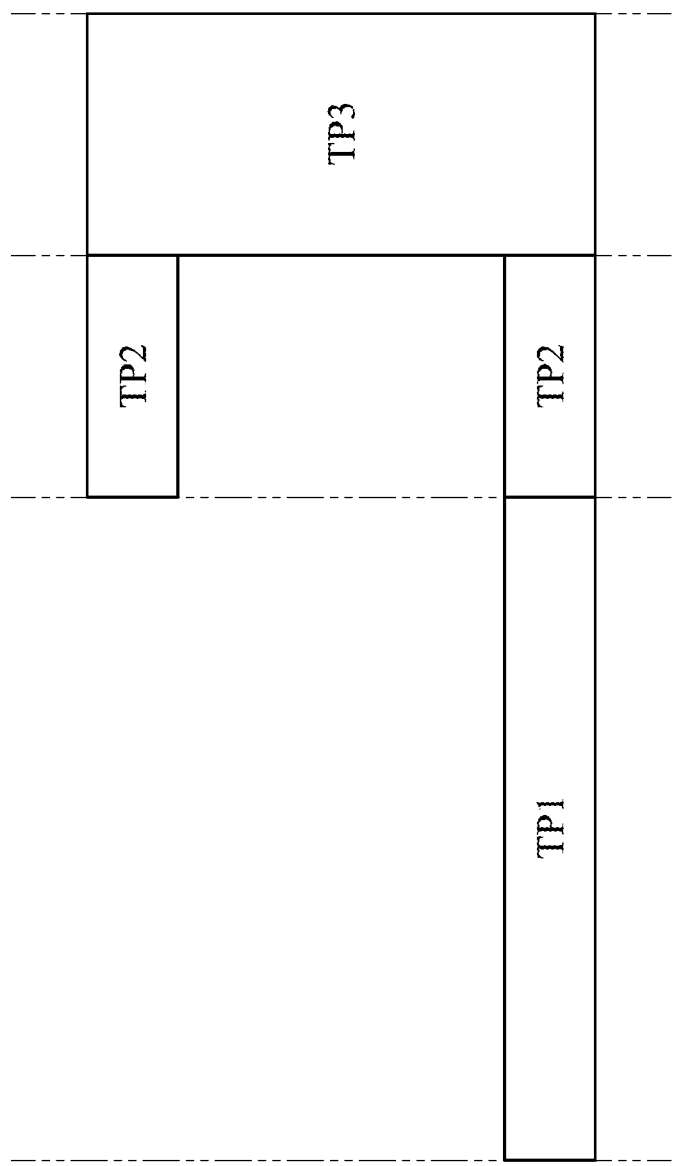
FIG. 3 is an operational diagram illustrating an operation of the pixel circuit 100 according to some embodiments of the present disclosure.

In the connection relationship, the sensing circuit 110, a sensing circuit 130, and an output circuit 150 are coupled to each other. For ease of explanation, the operation relationship of the pixel circuit 100 is mentioned in accordance to FIG. 3. Reference is made to FIG. 3. FIG. 3 is an operational diagram 300 illustrating an operation of the pixel circuit 100 according to some embodiments of the present disclosure.

Reference is made to FIG. 2 and FIG. 3 at the same time. As illustrated in FIG. 3, during time period TP1, the sensing circuit 110 is operated to sense light with an exposure time longer than the flickering cycle time, so as to obtain a first sensing result. During time period TP2, the sensing circuit 110 and the sensing circuit 130 are operated with an exposure time shorter than the flickering cycle time, so as to obtain a second sensing result and a third sensing result. In detail, the second sensing result is obtained by the sensing circuit 110, and the third sensing result is obtained by the sensing circuit 130.

During time period TP3, the output circuit 150 is configured to determine whether there is LED flickering according to the first sensing result, the second sensing result, and the third sensing result.

In some embodiments, the sensitivity of the sensing circuit 110 is lower than the sensitivity of the sensing circuit 130. In some embodiments, the size of the sensing circuit 110 is smaller than the size of the sensing circuit 130. However, the embodiments of the present disclosure are not limited thereto.

Reference is made to FIG. 2 again. As illustrated in FIG. 2, in some embodiments, the pixel circuit 100 further comprises an output node N1, a floating node N2, a readout circuit 170, and a reset circuit 190. In the connection relationship, the readout circuit 170 is coupled between the floating node N1 and the output node N2. The reset circuit 190 is coupled to the floating node N1.

In the operational relationship, the readout circuit 170 is configured to readout and to transfer the first sensing result, the second sensing result, and the third sensing result. The reset circuit 190 is configured to reset the voltage of the floating node N1 before the readout circuit 170 reads out the first sensing result, the second sensing result, and the third sensing result.

As illustrated in FIG. 2, in some embodiments, the pixel circuit 100 further includes a storage circuit 195. The storage circuit 195 temporally stores the first sensing result during a storage time after obtaining the first sensing result.

It should be noted that, the operational diagram 300 illustrated in FIG. 3 is operated under strong light environment. In some embodiments, the exposure time operated in time period TP2 is preset by the image sensing device 100 according to the environmental light. If the preset exposure time is shorter than the flickering cycle time, the operational diagram 300 illustrated in FIG. 3 is performed. On the other hand, reference is made to FIG. 4. If the preset exposure time is not shorter than the flickering cycle time, the operational diagram 400 as illustrated in FIG. 4 is performed.

Figure 4:
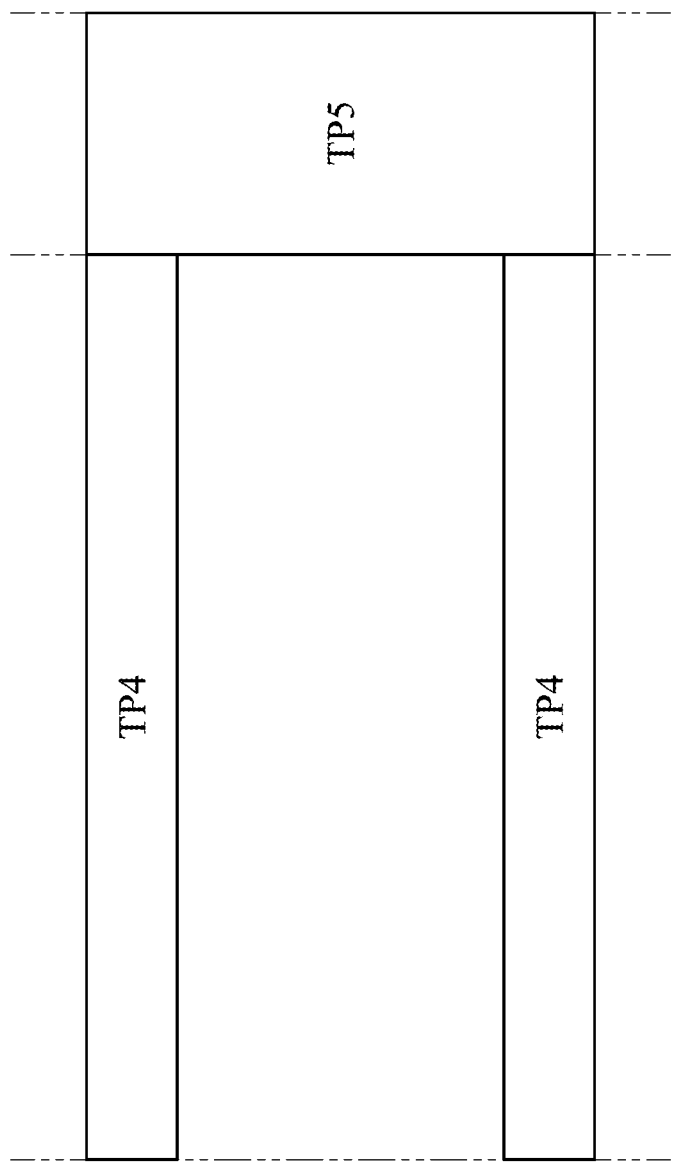
FIG. 4 is an operational diagram illustrating an operation of the pixel circuit 100 according to some embodiments of the present disclosure.

FIG. 4 is an operational diagram 400 illustrating an operation of the pixel circuit 100 according to some embodiments of the present disclosure. As illustrated in FIG. 4, during time period TP4, the sensing circuit 110 and the sensing circuit 130 senses light simultaneously with an exposure time, which is the preset exposure time, longer than the flickering cycle time, so as to obtain a fourth sensing result and a fifth sensing result. In detail, the fourth sensing result is obtained by the sensing circuit 110, and the fifth sensing result is obtained by the sensing circuit 130.

During time period TP5, the output circuit 150 is configured to determine whether there is LED flickering according to the fourth sensing result and the fifth sensing result.

Figure 5:
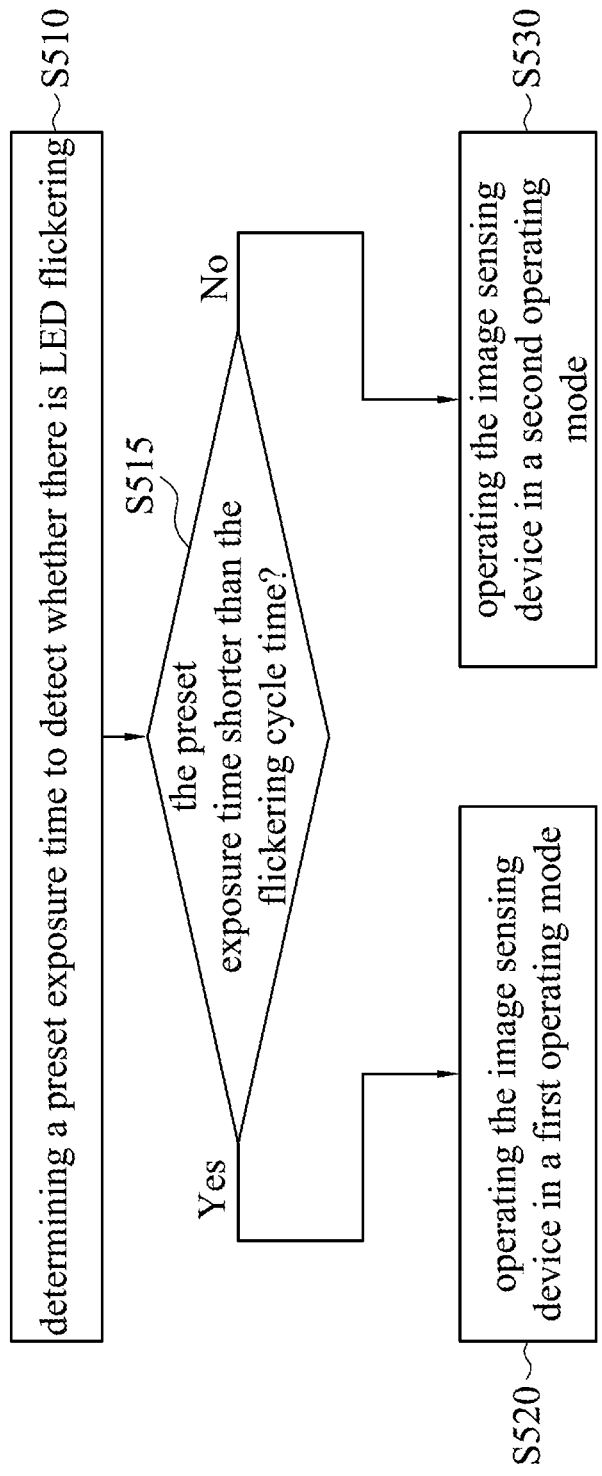
FIG. 5 is a flow chart illustrating an operating method according to some embodiments of the present disclosure.

Reference is made to FIG. 5. FIG. 5 is a flow chart 500 illustrating an operating method according to some embodiments of the present disclosure. The operating method 500 includes operations S510, S515, S520 and S530. For ease of understanding, the operating method 500 is explained below with reference to FIG. 1 to FIG. 4. These operations are given for illustrative purposes. Additional operations are within the contemplated scoped of the present disclosure. For example, in various embodiments, additional operations are provided before, during, and/or after the operations in the operating method 500, and/or some of the operations described are replaced or eliminated for other embodiments of the operating method 500.

In operation S510, determining a preset exposure time to detect whether there is LED flickering. In some embodiments, operation S510 may be operated by the image sensing device 1 as illustrated in FIG. 1. The preset exposure time is obtained according to the environmental light. When the environmental light is stronger, the preset exposure time is shorter.

In operation S515, determining whether the preset exposure time is shorter than the flickering cycle time or not. The flickering cycle time is the feature of the light emitting diode to be sensed. It should be noted that the flickering cycle time may differs between light emitting diodes.

In some embodiments, the operation S515 may be operated by the pixel circuit 100 as illustrated in FIG. 2 or the image sensing device 1 as illustrated in FIG. 1. When the preset exposure time is shorter than the flickering cycle time, operation S250 is operated. On the other hand, when the preset exposure time is not shorter than the flickering cycle time, operation S530 is operated. That is, according to the preset exposure time obtained in the operation S510, the operating mode of the image sensing device 1 is determined according to the preset exposure time.

In operation S520, operating the image sensing device in a first operating mode. In some embodiments, operation S520 may be operated by the sensing circuit 110 and the sensing circuit 130. Details of operation S520 may be described in below with reference to FIG. 6.

Figure 6:
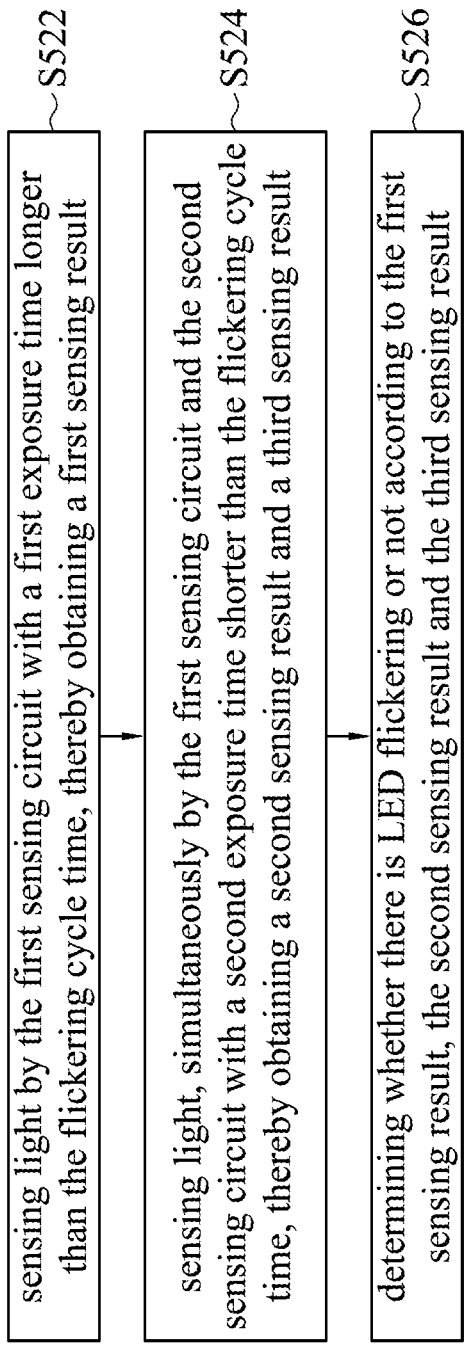
FIG. 6 is a flow chart illustrating the operation S520 in FIG. 5 according to some embodiments of the present disclosure.

FIG. 6 is a flow chart illustrating the operation S520 in FIG. 5 according to some embodiments of the present disclosure. Operation S520 includes operation S522 to S526.

In operation S522, sensing light by the first sensing circuit with a first exposure time longer than the flickering cycle time, thereby obtaining a first sensing result. In some embodiments, operation S522 may be operated by the sensing circuit 110 as illustrated in FIG. 2. For example, in some embodiments, the sensing circuit 110 senses light with an exposure time longer than the flickering cycle time, so as to obtain a first sensing result.

In some embodiments, after operation S522, the first sensing result is temporally stored by the storage circuit 195.

In operation S524, sensing light, simultaneously by the first sensing circuit and the second sensing circuit with a second exposure time shorter than the flickering cycle time, thereby obtaining a second sensing result and a third sensing result. In some embodiments, the operation S524 may be operated by the sensing circuit 110 and the sensing circuit 130 as illustrated in FIG. 2. In some embodiments, the second exposure time mentioned in operation S524 is the preset exposure time mentioned in operation S510.

For example, in operation S524, in some embodiments, the sensing circuit 110 senses light with an exposure time shorter than the flickering cycle time so as to obtain a second sensing result, and the sensing circuit 130 senses light with an exposure time shorter than the flickering cycle time so as to obtain a third sensing result.

In operation S526, determining whether there is LED flickering or not according to the first sensing result, the second sensing result and the third sensing result. In some embodiments, the operation S526 may be operated by the output circuit 150 as illustrated in FIG. 2. In some embodiments, the first sensing result, the second sensing result, and the third sensing result are transferred to the output circuit 150 through the readout circuit 170.

In operation S526, if the second sensing result and the third sensing result indicate that there is no LED flickering but the first sensing result indicates that there is LED flickering, the output circuit 150 determines that there is LED flickering. Furthermore, if all of the first sensing result, the second sensing result, and the third sensing result indicate that there is no LED flickering, the output circuit 150 determines that there is no LED flickering. On the other hand, if all of the first sensing result, the second sensing result, and the third sensing result indicate that there is LED flickering, the output circuit 150 determines that there is LED flickering.

During operation S526, in some embodiments, before the readout circuit 170 reads out the first sensing result, reads out the second sensing result, and reads out the third sensing result, the voltage of the floating node N1 as illustrated in FIG. 2 is reset by the reset circuit 190.

Reference is made to FIG. 5 again. In operation S530, operating the image sensing device in a second operating mode. In some embodiments, operation S530 may be operated by the sensing circuit 110 and the sensing circuit 130 as illustrated in FIG. 2.

In detail, in operation S530, the sensing circuit 110 and the sensing circuit 130 senses light simultaneously with an exposure time longer than the flickering cycle time, so as to obtain a fourth sensing result and a fifth sensing result. In some embodiments, the exposure time in operation S530 is the preset exposure time obtained in operation S510. During operation S530 the sensing circuit 110 obtains the fourth sensing result, and the sensing circuit 130 obtains the fifth sensing result. Then, the readout circuit 150 determines whether there is LED flickering or not during the exposed duration according to the fourth sensing result and the fifth sensing result.

That is, if the preset exposure time to detect whether there is LED flickering is smaller than the flickering cycle time, an additional light sensing with an exposure time longer than the flickering cycle time is performed so as to increase the detection accuracy of LED flickering.

In some embodiments, reference is made to FIG. 3 again. During time period TP1, light sensing may be performed by at least one sensing circuit with the exposure time longer than the flickering cycle time, thereby obtaining at least one first sensing result. During time period TP2, light sensing may be performed simultaneously by several sensing circuits, with an exposure time shorter than the flickering cycle time, thereby obtaining several second sensing results. During time period TP3, whether there is LED flickering or not is determined according to the at least one first sensing result and the second sensing results. In some embodiments, the sensing circuits operated during time period TP2 may include different sensitivities between each other, and the sensing circuits operated during time period TP1 has sensitivity less than at least one of the sensing circuits operated during time period TP2. However, the embodiments of the present disclosure are not limited thereto.

Reference is made to FIG. 2 again. In some embodiments, the sensing circuit 110 includes a photo diode S1 and a switch T1. The sensing circuit 130 includes a photo diode S1 and a switch T2. The readout circuit 170 includes switches T6 and T7. The reset circuit 190 includes a switch T5. The storage circuit 195 includes a capacitor and switches T3 and T4.

Figure 7:
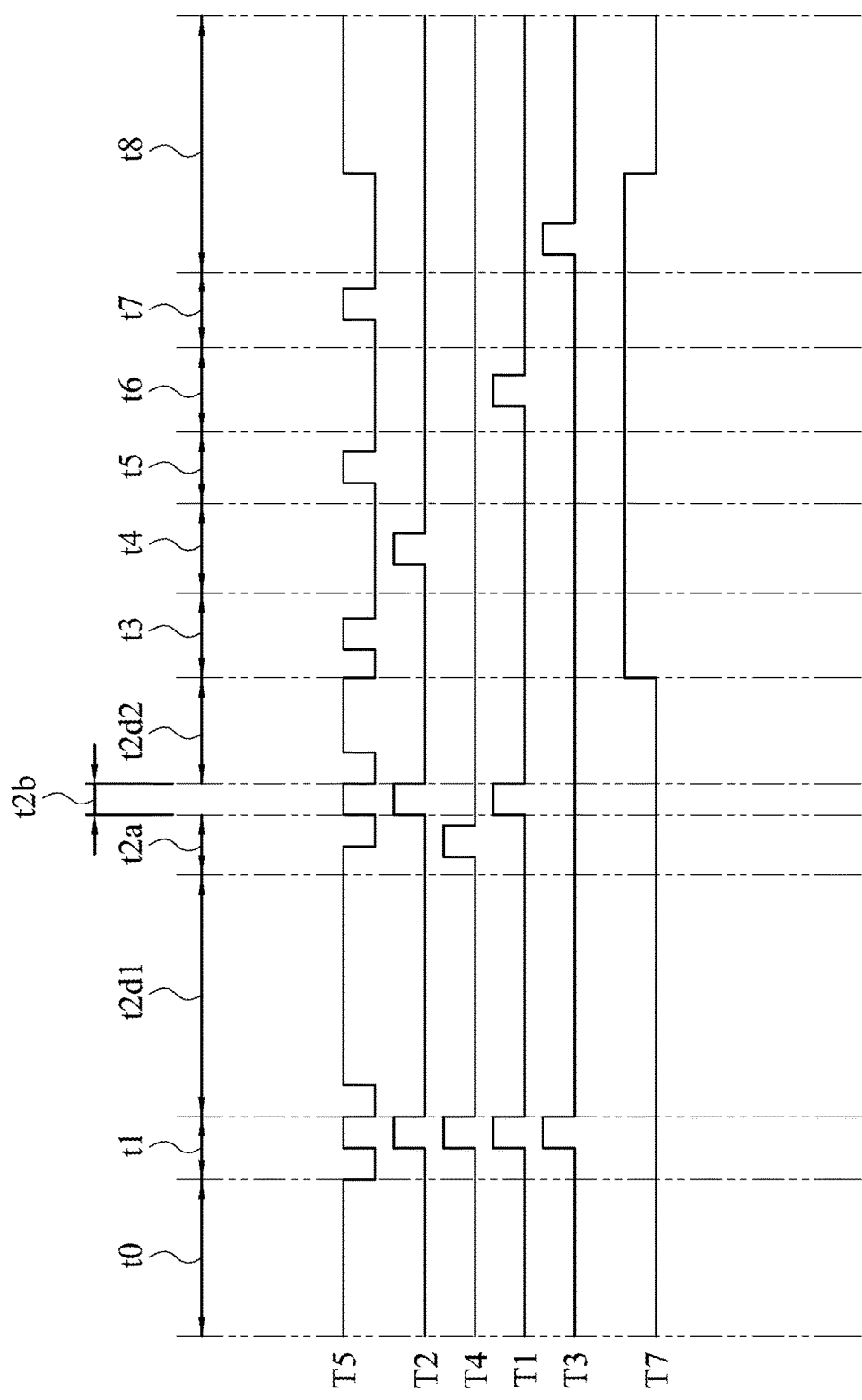
FIG. 7 is a diagram illustrating an operating signal waveform diagram of operation S520 as illustrated in FIG. 5 according to some embodiments of the present disclosure.

Reference is made to FIG. 7. FIG. 7 is a diagram illustrating an operating signal waveform diagram 700 of operation S520 as illustrated in FIG. 5 according to some embodiments of the present disclosure. For ease of explanation, FIG. 7 is described in below with reference to FIG. 2.

During time period t1, switches T1 to T7 are in the standby mode. During time period t1, switches T1 to T5 are ON. During time period t2d1, only the switch T5 is ON, so as to reset the voltage of the floating node N1. The photo diode S1 performs light sensing during time period t2d1 so as to obtain a first sensing result. During time period t2a, the switch T2 is OFF, and the switch T4 is ON, so that the first sensing result obtained by the photo diode S1 may be transferred to the capacitor C. During time period t2b, the switch T4 is OFF, and the switches T5, T2, and T1 are ON. That is, during the time period t2b, the first sensing result is stored in the capacitor C, the voltage of the floating node N1 is reset and the voltages of the photo diodes S1 and S2 are also reset.

Then, during time period t2d2, switches T1 to T4 are OFF, and the photo diodes S1 and S2 perform light sensing so as to obtain the second sensing result and the third sensing result. Before time period t3, the switch T5 is ON so as to reset the voltage of the floating node N1.

During time period t3 to t8, the switch T7 is ON, so as to readout the sensing results to the output circuit 150. In detail, during the time period t3, the switch T5 is ON, and the voltage of the floating node N1 is reset. During the time period t4, the switch T2 is ON, and the third sensing result obtained by the photo diode S2 is transferred to the readout circuit 170 and the output circuit 150. During the time period t5, the switch T5 is ON, and the voltage of the floating node N1 is reset. During the time period t6, the switch T1 is ON, and the second sensing result obtained by the photo diode S1 is transferred to the readout circuit 170 and the output circuit 150. During the time period t7, the switch T5 is ON, and the voltage of the floating node N1 is reset. During the time period t8, the switch T3 is ON, and the first sensing result stored in the capacitor C is transferred to the readout circuit 170 and the output circuit 150.

Figure 8:
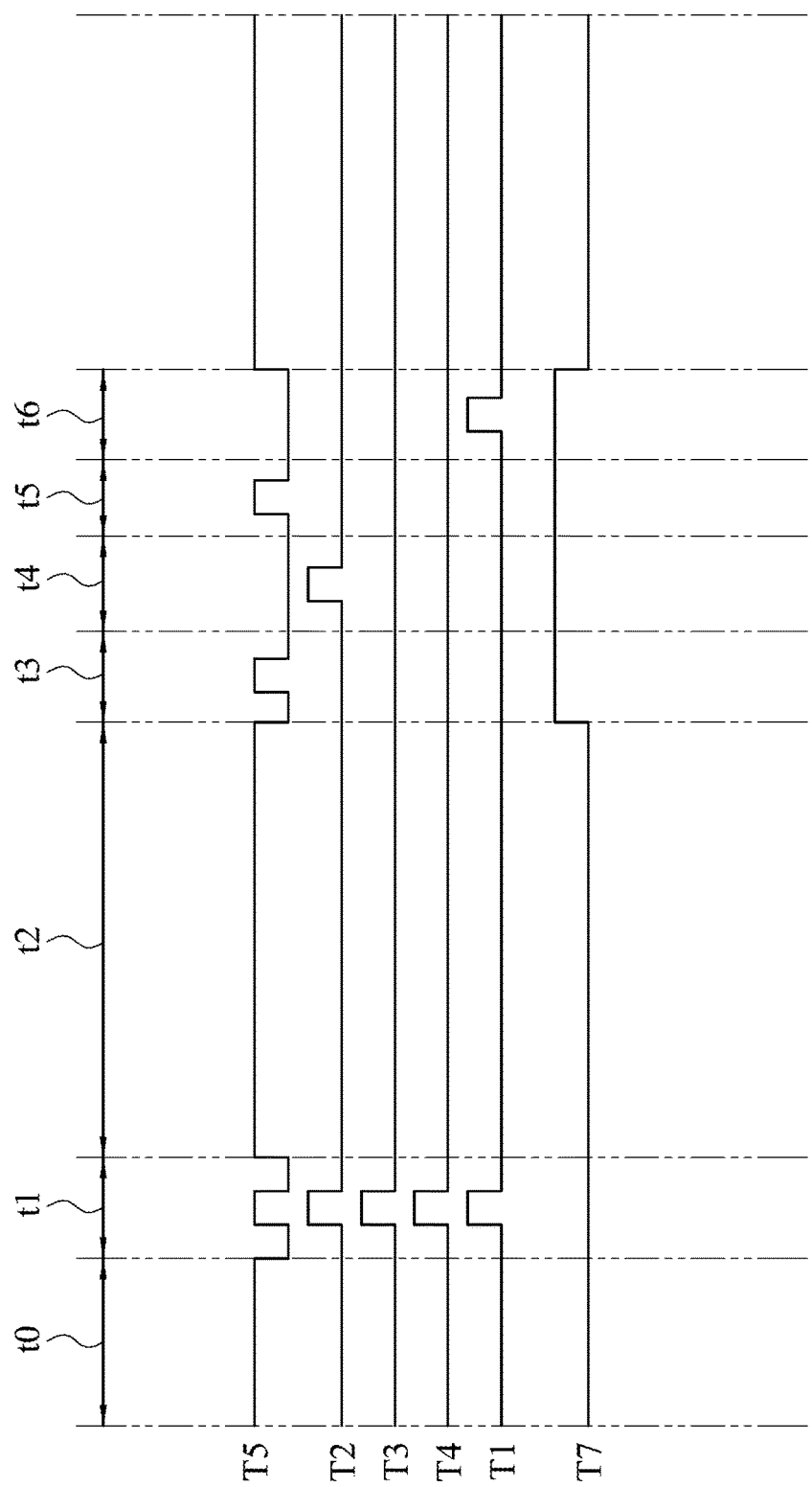
FIG. 8 is a diagram illustrating an operating signal waveform diagram of operation S530 as illustrated in FIG. 5 according to some embodiments of the present disclosure.

Reference is made to FIG. 8. FIG. 8 is a diagram illustrating an operating signal waveform diagram 800 of operation S530 as illustrated in FIG. 5 according to some embodiments of the present disclosure. For ease of explanation, FIG. 8 is described in below with reference to FIG. 2.

During time period t0, all of the switches T1 to T7 are in the standby condition. During time period t1, the switches T1 to T5 and T7 (except T6) are ON. During time period t2, only the switch T5 is ON, so as to reset the voltage of the floating node N1. During the time period t2, the photo diode S1 performs light sensing so as to obtain a fourth sensing result, and the photo diode S2 performs light sensing so as to obtain a fifth sensing result.

During time period t3 to t6, the switch T7 is ON, so as to readout the sensing results to the output circuit 150. In detail, during the time period t3, the switch T5 is ON, and the voltage of the floating node N1 is reset. During the time period t4, the switch T2 is ON, and the fifth sensing result obtained by the photo diode S2 is transferred to the readout circuit 170 and the output circuit 150. During the time period t5, the switch T5 is ON, and the voltage of the floating node N1 is reset. During the time period t6, the switch T1 is ON, and the fourth sensing result obtained by the photo diode S1 is transferred to the readout circuit 170 and the output circuit 150.

Figure 9:
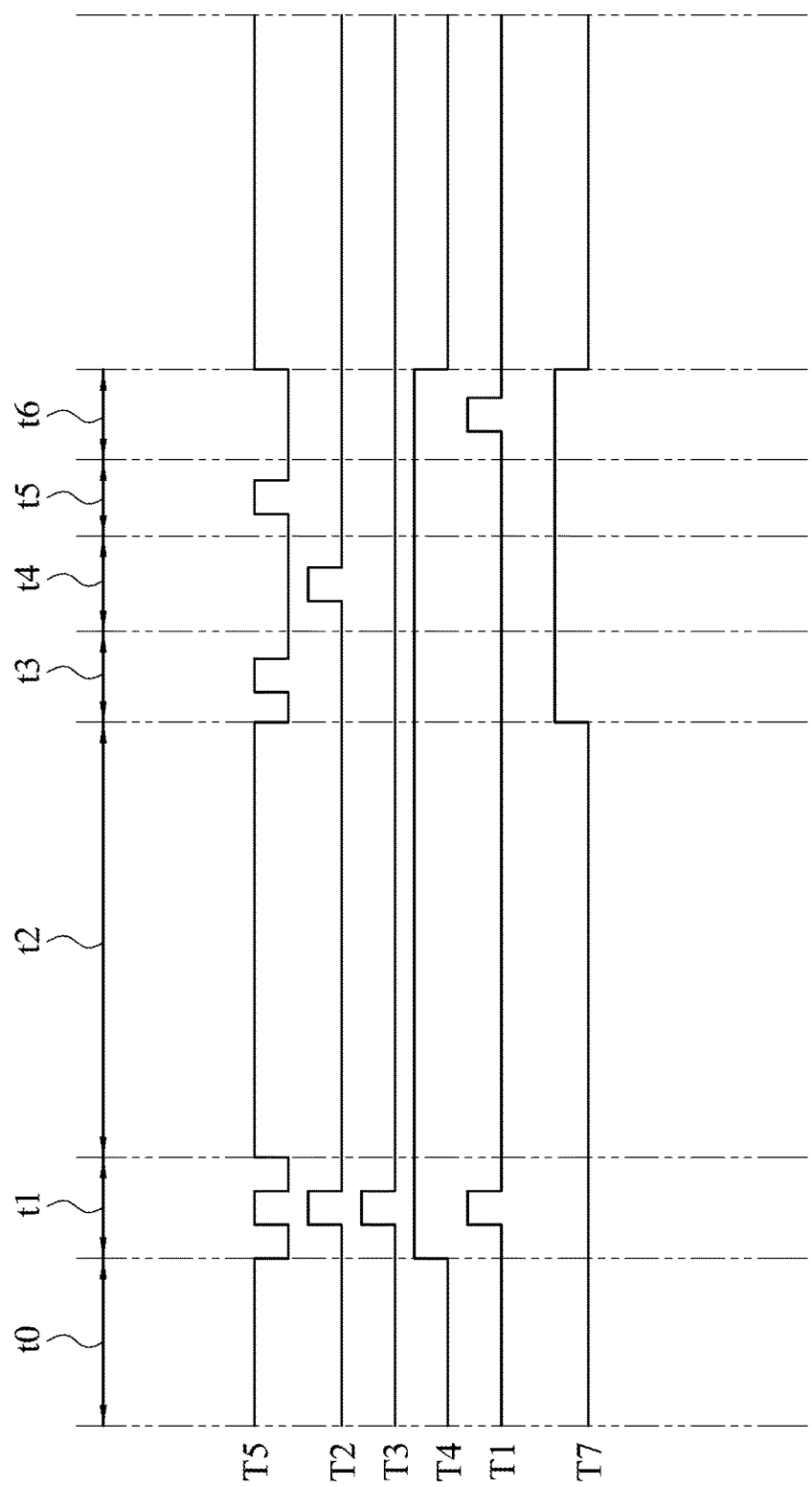
FIG. 9 is a diagram illustrating another operating signal waveform diagram of operation S530 as illustrated in FIG. 5 according to some embodiments of the present disclosure.

Reference is made to FIG. 9. FIG. 9 is a diagram illustrating another operating signal waveform diagram 900 of operation S530 as illustrated in FIG. 5 according to some embodiments of the present disclosure. For ease of explanation, FIG. 9 is described in below with reference to FIG. 2.

The difference between the wave diagram 900 and the wave diagram 800 is that in the wave diagram 900, the switch T4 is ON during time periods from t1 to t6. In this way, the capacitor C and the capacitor of the switch T4 may be utilized while the photo diode S1 is obtaining the fourth sensing result.

It should be noted that, the sequence of transferring the sensing results may be adjusted, and the sequences of transferring the sensing results mentioned in FIG. 7 to FIG. 9 are for illustrative purposes only, and the embodiments of the present disclosure is not limited thereto.

In some embodiments, the image sensing device 1 may be applied to an electronic rearview mirror that users do not like to see flashing. The image sensing device 1 may also be applied to some cars with ADAS (Advanced Driver Assistance Systems), which will detect traffic lights and speed limits. The image sensing device may also be any other circuits with the function of light sensing. The switches T1 to T7 may be PMOS transistors, NMOS transistors, or any other circuits with the function of switches.

It may be known from the embodiments mentioning above, the embodiments of the present disclosure provide an image sensing device and an operating method thereof, and in particular, the invention relates to an image sensing device and an operating method thereof with sensing circuits of different sensitivities. By performing an additional light sensing with an exposure time longer than the flickering cycle time of the LED under strong light environment, the LED detection capability under strong light is maintained without sacrificing dynamic range detection.

In this document, the term "coupled" may also be termed as "electrically coupled", and the term "connected" may be termed as "electrically connected". "Coupled" and "connected" may also be used to indicate that two or more elements cooperate or interact with each other. It will be understood that, although the terms "first," "second," etc., may be used herein to describe various elements, these elements should not be limited by these terms. These terms are used to distinguish one unit from another. For example, a first unit could be termed a second element, and, similarly, a second unit could be termed a first element, without departing from the scope of the embodiments. As used herein, the term "and/or" includes any and all combinations of one or more of the associated listed items.

In addition, the above illustrations comprise sequential demonstration operations, but the operations need not be performed in the order shown. The execution of the operations in a different order is within the scope of this disclosure. In the spirit and scope of the embodiments of the present disclosure, the operations may be increased, substituted, changed and/or omitted as the case may be.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An operating method of an image sensing device capable of detecting a plurality of light emitting diodes each having a flickering cycle time, the image sensing device comprising a first sensing circuit and a second sensing circuit, the operating method comprising:
    determining a first exposure time and a second exposure time;
    operating the image sensing device in a first operating mode when the second exposure time is shorter than the flickering cycle time;
    sensing light, simultaneously by the first sensing circuit and the second sensing circuit with the second exposure time to obtain a first sensing result and a second sensing result;
    performing an additional light sensing by the first sensing circuit with the first exposure time to obtain a third sensing result, wherein the first exposure time is longer than the flickering cycle time; and
    determining whether there is LED (light emitting diode) flickering according to the first sensing result, the second sensing result and the third sensing result.

2. The operating method of claim 1, wherein a sensitivity of the first sensing circuit is lower than a sensitivity of the second sensing circuit.

3. The operating method of claim 1, wherein a size of the first sensing circuit is smaller than a size of the second sensing circuit.

4. The operating method of claim 1, comprising:
    determining the image sensing device to operate in a second operating mode when the second exposure time of the image sensing device is greater than the flickering cycle time.

5. The operating method of claim 4, wherein operating the image sensing device in the second operating mode comprises:
    sensing light, simultaneously by the first sensing circuit and the second sensing circuit with a fourth exposure time longer than the flickering cycle time, thereby obtaining a fourth sensing result and a fifth sensing result; and determining whether there is LED flickering or not according to the fourth sensing result and the fifth sensing result.

6. The operating method of claim 1, further comprising: temporally storing the third sensing result by a storage circuit during a storage time after obtaining the third sensing result.

7. The operating method of claim 1, further comprising: determining there is LED flickering when the second sensing result and the first sensing result indicate there is no LED flickering but the third sensing result indicates there is LED flickering.

8. The operating method of claim 1, further comprising: resetting a voltage of a floating node, wherein the floating node is coupled to the first sensing circuit and the second sensing circuit, before reading out the third sensing result, reading out the second sensing result, and reading out the first sensing result, respectively.

9. An operating method of an image sensing device capable of detecting a plurality of light emitting diodes each having a flickering cycle time, the operating method comprising:

determining a first exposure time is shorter than a flickering cycle time;

obtaining a first sensing result based on the first exposure time by a first sensing circuit;

performing an additional light sensing with a second exposure time longer than the flickering cycle time to obtain a second sensing result by a second sensing circuit; and determining whether there is LED flickering based on the first sensing result and the second sensing result.

10. The operating method of claim 9, wherein the first sensing circuit and the second sensing circuit comprise different sensitivities.

11. The operating method of claim 9, wherein the second sensing circuit has sensitivity less than the first sensing circuit.

12. An image sensing device capable of detecting a plurality of light emitting diodes each having a flickering cycle time, the image sensing device comprising a plurality of pixel circuits, wherein each of the plurality of pixel circuits comprises:

a first sensing circuit, configured to perform an additional light sensing with a first exposure time longer than a flickering cycle time when it is determined that a second exposure time is shorter than the flickering cycle time, thereby obtaining a first sensing result;

a second sensing circuit, wherein the first sensing circuit and the second sensing circuit are configured to sense light simultaneously with the second exposure time shorter than the flickering cycle time, thereby obtaining a second sensing result and a third sensing result; and an output circuit, configured to determine whether there is LED flickering or not according to the first sensing result, the second sensing result and the third sensing result.

13. The image sensing device of claim 12, wherein a sensitivity of the first sensing circuit is lower than a sensitivity of the second sensing circuit.

14. The image sensing device of claim 12, wherein a size of the first sensing circuit is smaller than a size of the second sensing circuit.

15. The image sensing device of claim 12, wherein each of the plurality of pixel circuits further comprises:

an output node;

a floating node;

a readout circuit coupled between the floating node and the output node; and a reset circuit coupled to the floating node and configured to reset a voltage of the floating node before the readout circuit reads out the first sensing result, reads out the second sensing result, and reads out the third sensing result, respectively.

16. The image sensing device of claim 12, wherein each of the plurality of pixel circuits further comprises:

a storage circuit, configured to temporally store the first sensing result.

* * * * *